US012724391B2

(12) United States Patent
Fujita et al.

(10) Patent No.: US 12,724,391 B2
(45) Date of Patent: Sep. 1, 2026

(54) PROGRAM GENERATION APPARATUS AND PROGRAM GENERATION METHOD

(71) Applicants: Mitsubishi Electric Corporation, Tokyo (JP); OSAKA UNIVERSITY, Osaka (JP)

(72) Inventors: Kohei Fujita, Tokyo (JP); Toshimitsu Ushio, Osaka (JP)

(73) Assignees: MITSUBISHI ELECTRIC CORPORATION, Tokyo (JP); OSAKA UNIVERSITY, Osaka (JP)

( * ) Notice: Subject to any disclaimer, the term of this patent is extended or adjusted under 35 U.S.C. 154(b) by 347 days.

(21) Appl. No.: 18/280,673

(22) PCT Filed: Apr. 2, 2021

(86) PCT No.: PCT/JP2021/014264

§ 371 (c)(1),
(2) Date: Sep. 7, 2023

(87) PCT Pub. No.: WO2022/208860

PCT Pub. Date: Oct. 6, 2022

(65) Prior Publication Data

US 2024/0168447 A1 May 23, 2024

(51) Int. Cl.
*G05B 19/04* (2006.01)
*G05B 19/042* (2006.01)
(Continued)

(52) U.S. Cl.
CPC ....... *G05B 19/0426* (2013.01); *G05B 19/056* (2013.01); *G05B 19/408* (2013.01)

(58) Field of Classification Search
CPC ......................... G05B 19/0426; G05B 19/056; G05B 19/408; G06F 8/35
See application file for complete search history.

(56) References Cited

U.S. PATENT DOCUMENTS

2002/0101451 A1* 8/2002 Duemler .............. G05B 19/056 715/764
2010/0063606 A1* 3/2010 Noetzelmann ....... G05B 19/056 700/86

(Continued)

FOREIGN PATENT DOCUMENTS

CN 1542575 A 11/2004
JP H04-018605 A 1/1992

OTHER PUBLICATIONS

Kupferman et. al., "Model Checking of Safety Properties", Formal Methods in System Design, vol. 19, 2001, pp. 291-314.
Dana Angluin, "Learning Regular Sets from Queries and Counter-examples*", Information and Computation, vol. 75, 1987, pp. 87-106.
International Search Report and Written Opinion mailed on Jun. 22, 2021, received for PCT Application PCT/JP2021/014264, filed on Apr. 2, 2021, 8 pages including English Translation.

(Continued)

*Primary Examiner* — Christopher W Carter
(74) *Attorney, Agent, or Firm* — XSENSUS LLP

(57) ABSTRACT

Operating efficiency of a target to be controlled is enhanced, and a degree of freedom in converting a language of a program is enhanced. A program generation apparatus includes: a design information conversion unit that converts design information, which includes a plurality of states of a device, relationships between signals and the states of the device, and time required for changes of the states of the device, into a model, which includes a state set, an input set, a transition function, and time required for transitions; a control law derivation unit that derives a control law, based on a requirements specification including a specification related to the time required for the transitions and the model, so as to satisfy the requirements specification; and a program generation unit that generates a program, based on the control law.

16 Claims, 13 Drawing Sheets

(51) Int. Cl.
*G05B 19/05* (2006.01)
*G05B 19/408* (2006.01)

(56) References Cited

U.S. PATENT DOCUMENTS

| | | | | |
|---|---|---|---|---|
| 2013/0055196 | A1* | 2/2013 | Canedo | G06F 8/30<br>717/104 |
| 2014/0046457 | A1* | 2/2014 | Taber | G05B 19/056<br>700/2 |
| 2018/0120819 | A1* | 5/2018 | Ishiwari | G05B 17/02 |
| 2019/0086880 | A1* | 3/2019 | Todoli | G05B 19/056 |

OTHER PUBLICATIONS

Rui Wang et al., “Formal modeling and synthesis of programmable logic controllers”, Computers in Industry, Elsevier, published on Jan. 31, 2011, pp. from 23-31, total 9 pages.

Parisa Heidari, “A Forward On-The-Fly Approach for Safety and Reachability Controller Synthesis of Timed Systems”, École Polytechnique de Montréal, published on Feb. 29, 2012, total 141 pages.

Chih-Hong Cheng et al., “G4LTL-ST: Automatic Generation of PLC Programs”, arXiv:1405.2409, published on May 11, 2014, total 9 pages.

The First Office Action mailed Mar. 18, 2026, in Chinese Application No. 202180096505.0, 17 pages including English translation.

* cited by examiner

F I G. 2
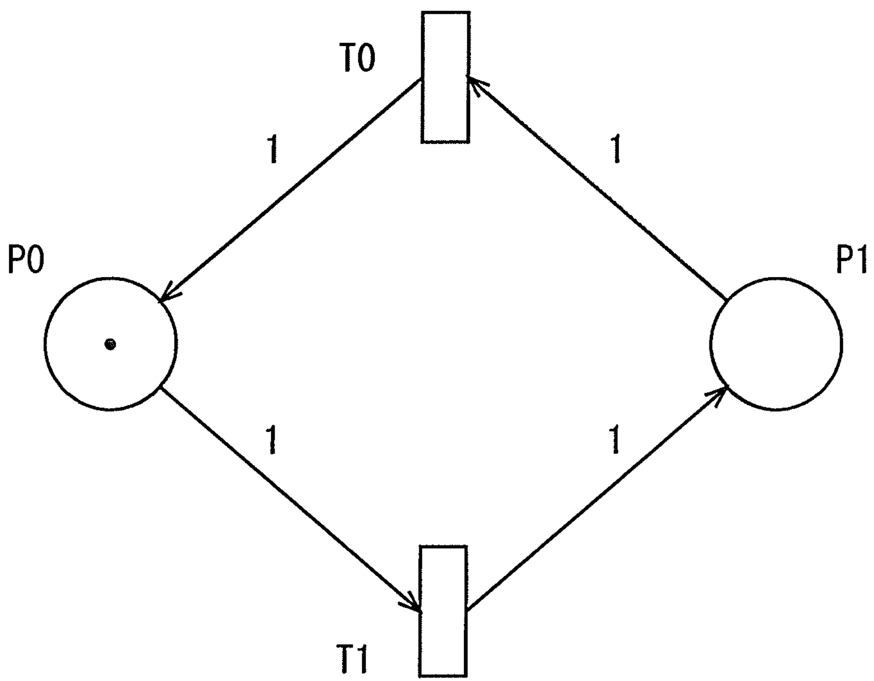

PROGRAM GENERATION APPARATUS AND PROGRAM GENERATION METHOD

CROSS-REFERENCE TO RELATED APPLICATION

This application is based on PCT filing PCT/JP2021/014264, filed Apr. 2, 2021, the entire contents of which are incorporated herein by reference.

TECHNICAL FIELD

A technology disclosed in the specification of the present application relates to generation of a program.

BACKGROUND ART

A machine constituting a production system or the like is controlled using a program executed in a controller such as a programmable logic controller (for example, see Patent Document 1).

PRIOR ART DOCUMENTS

Patent Document

Patent Document 1: Japanese Patent Application Laid-Open No. 4-18605 (1992)

SUMMARY

Problem to be Solved by the Invention

In the technology described in Patent Document 1, transitions of states and operations of a machine are expressed using a Petri net model. However, in the model in Patent Document 1, information of time required for transitions of the operations of the machine is not taken into consideration. Thus, a generated program cannot be optimized regarding time. As a result, it has hitherto been difficult to enhance productivity of a production system as a target to be controlled.

In addition, a rule for converting a program presupposes the ladder language, and thus it has hitherto been difficult to carry out conversion into such a language (for example, ST, FBD, SFC, or the like) that is defined in IEC 61131-3 other than the ladder language, or a general language (for example, C/C++ or the like).

The technology disclosed in the specification of the present application is made in view of the problems as described above, and is a technology for enhancing operating efficiency of a target to be controlled and enhancing a degree of freedom in converting a language of a program.

Means to Solve the Problem

A program generation apparatus as a first aspect of the technology disclosed in the specification of the present application is a program generation apparatus configured to generate a program to be executed in a controller that controls a target to be controlled. The program generation apparatus includes: a design information conversion unit configured to convert design information into a model, the design information at least including a plurality of states of a device constituting the target to be controlled, respective relationships between signals input and output between the target to be controlled and the controller and the plurality of states of the device, and time required for each of changes of the plurality of states of the device, the model at least including a state set being a set of the plurality of states of the device, an input set being a set of the signals input from the controller to the target to be controlled, a transition function being a function representing transitions between the plurality of states of the device included in the state set, the transitions being caused due to the signals input to the target to be controlled, and time required for each of the transitions represented by the transition function; a control law derivation unit configured to derive a control law for respectively associating the plurality of states of the device and the signals input from the controller to the target to be controlled, based on a requirements specification including a specification related to the time required for each of the transitions of the plurality of states of the device and the model, so as to satisfy the requirements specification; and a program generation unit configured to generate the program, based on the control law.

Effects of the Invention

According at least to the first aspect of the technology disclosed in the specification of the present application, the control law is derived based on the model including the time required for the transitions, so as to satisfy the requirements specification including the time required for the transitions. Therefore, control related to time is performed in the program generated based on the control law, and operating efficiency of the target to be controlled can be thus enhanced. Further, a rule for converting the generated program is not limited to the ladder language. Therefore, a degree of freedom in converting a language of the program is enhanced.

These and other objects, features, aspects and advantages of the technology disclosed in the specification of the present application will become more apparent from the following detailed description of the technology disclosed in the specification of the present application when taken in conjunction with the accompanying drawings.

BRIEF DESCRIPTION OF DRAWINGS

FIG. 2 is a diagram illustrating an example of a case for modeling a pusher apparatus.

FIG. 10 is actually put into operation.

FIG. 10 is actually put into operation.

DESCRIPTION OF EMBODIMENTS

Figure 1:
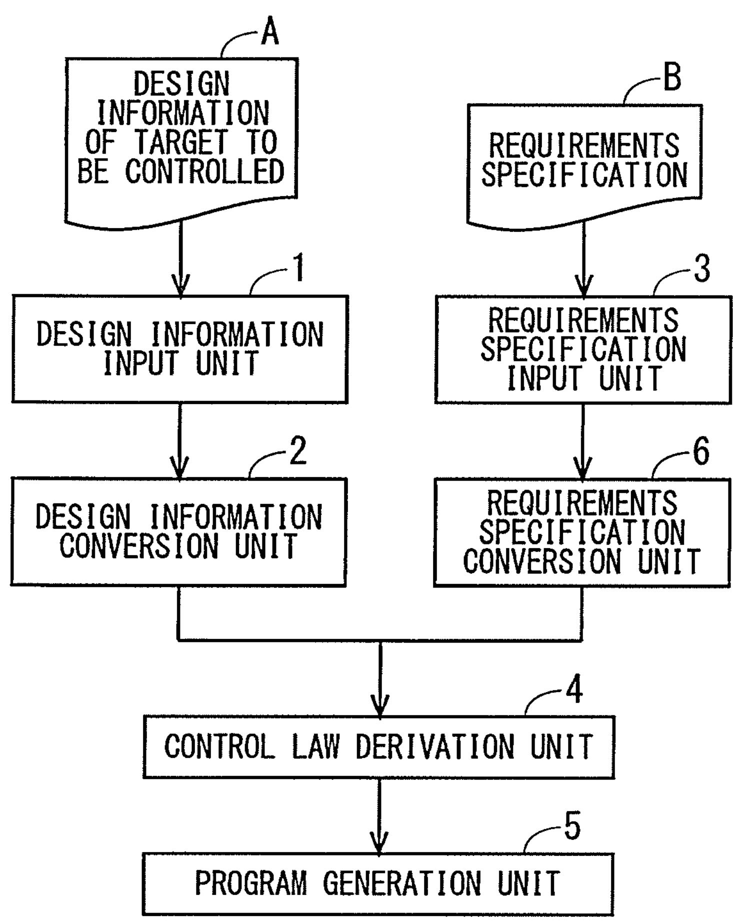
FIG. 1 is a diagram conceptually illustrating an example of a configuration of a program generation apparatus according to an embodiment.

Embodiments will be described below with reference to the accompanying drawings. In the following embodiments, detailed features and the like will be described for the sake of description of the technology. However, those are merely examples, and not necessarily all of those are essential features to enable implementation of the embodiments.

Note that the drawings are schematically illustrated, and for the sake of convenience of description, configurations are omitted or configurations are simplified as appropriate in the drawings. Further, interrelationships of sizes and positions of the configurations and the like illustrated in different drawings are not necessarily accurately illustrated, and may be changed as appropriate. Further, hatching may be employed to facilitate understanding of details of the embodiments in the drawings such as plan views, as well as cross-sectional diagrams.

Further, in the following description, similar constituent elements are denoted by the same reference signs in the drawings, and are given similar terms and functions as well. Thus, detailed description of such constituent elements may be omitted to avoid redundancy.

Further, in the description given in the specification of the present application, unless otherwise specifically noted, a description of "being provided with", "including", or "having" a certain constituent element, for example, is not an exclusive expression excluding presence of other constituent elements.

Further, in the description given in the specification of the present application, even when ordinal numbers, such as "first" and "second", are used, these terms are used for the sake of convenience to facilitate understanding of details of the embodiments, and the details of the embodiments are not limited to the order and the like that may be generated due to these ordinal numbers.

<Conceptual Configuration of Program Generation Apparatus>

Figure 11:
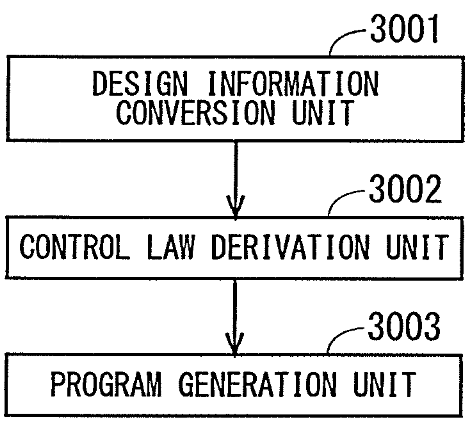
FIG. 11 is a diagram conceptually illustrating an example of a configuration of a program generation apparatus according to the present embodiment.

FIG. 11 is a diagram conceptually illustrating an example of a configuration (functional units) of a program generation apparatus according to the present embodiment.

The program generation apparatus conceptually illustrated in FIG. 11 is a program generation apparatus for generating a program to be executed in a controller that controls a target to be controlled.

As illustrated in FIG. 11, the program generation apparatus includes a design information conversion unit 3001, a control law derivation unit 3002, and a program generation unit 3003.

The design information conversion unit 3001 converts design information, which at least includes a plurality of states of a device constituting the target to be controlled, respective relationships between signals input and output between the target to be controlled and the controller and the states of the device, and time required for each of changes of the states of the device, into a model, which at least includes a state set being a set of states of the device, an input set being a set of signals input from the controller to the target to be controlled, a transition function being a function representing transitions between the states of the device included in the state set as caused due to the signals input to the target to be controlled, and time required for each of the transitions represented by the transition function.

The control law derivation unit 3002 derives a control law for respectively associating the states of the device and the signals input from the controller to the target to be controlled, based on a requirements specification including a specification related to the time required for the transitions of the states of the device and the model, so as to satisfy the requirements specification.

The program generation unit 3003 generates the program, based on the control law.

Each of the configurations to be described in the following embodiments with reference to the drawings and the like is a configuration for further specifically describing the example of the configuration illustrated in FIG. 11 above.

First Embodiment

A program generation apparatus and a program generation method according to the present embodiment will be described below.

<Configuration of Program Generation Apparatus>

The program generation apparatus according to the present embodiment is an apparatus that generates a program to be executed in a controller for controlling a production system.

Examples of the controller for controlling a production system include a programmable logic controller (i.e., a PLC), a numerical control apparatus (numerical control, i.e., NC), and an industrial PC. However, the controller is not limited to these, and the present disclosure can be applied to any controller that controls a target to be controlled, on the condition that the controller is capable of describing design information for modeling the target to be controlled in a method to be described later and a requirements specification for an operation of the target to be controlled.

FIG. 1 is a diagram conceptually illustrating an example of a configuration of the program generation apparatus according to the present embodiment.

As illustrated in FIG. 1, the program generation apparatus includes a design information input unit 1, a design information conversion unit 2, a requirements specification input unit 3, a control law derivation unit 4, a program generation unit 5, and a requirements specification conversion unit 6. Design information A of the target to be controlled is input to the design information input unit 1, and a requirements specification B is input to the requirements specification input unit 3.

The design information input unit 1 outputs the input design information A of the target to be controlled to the design information conversion unit 2, in a format that can be converted in the design information conversion unit 2 to be described later.

The design information A of the target to be controlled is information at least including states of the device constituting the target to be controlled, relationships between the signals input and output between the target to be controlled and the controller and the states of the device, and time required for change of the device from a certain state to another state.

The format of the design information A of the target to be controlled when the design information A of the target to be controlled is output to the design information conversion unit 2 is, for example, a Petri net, a state transition diagram, or the like. However, the format of the design information A of the target to be controlled need not be set to these formats in advance at the time point of being input to the design information input unit 1. It may be conceivable that the design information A of the target to be controlled in a format such as an interactive input using a graphical user interface (i.e., a GUI) or an input using a 3D CAD tool is converted in the design information input unit 1, and the design information A of the target to be controlled is then output to the design information conversion unit 2 as a format such as a Petri net or a state transition diagram.

The design information conversion unit 2 converts the design information A of the target to be controlled input from the design information input unit 1 to a transition system (model). The transition system may include a set of all possible states (state set) of the device constituting the target to be controlled, a set of input signals (input set) from the controller to the target to be controlled, a transition function representing transitions between the states included in the state set due to the respective input signals, time required for each of the transitions defined in the transition function, and a property satisfied by each of the states included in the state set.

The property satisfied by each of the states included in the state set is, for example, represented by a set of propositions. For example, when the design information A of the target to be controlled is expressed in a Petri net format, the proposition is a description related to a relationship between places and tokens, such as “there is one token in place A”.

To the requirements specification input unit 3, the requirements specification B having a description regarding state transitions of the target to be controlled is input. The requirements specification B is a formula in which a specification to be satisfied by the target to be controlled is described using a proposition, and is, for example, expressed using a temporal logic formula or the like with the above-described proposition being an atomic proposition. The requirements specification B at least includes a specification related to the time required for the transitions of the states of the device.

Further, the requirements specification input unit 3 checks whether the input requirements specification B is contradictory or not. When all of combinations of Boolean values of propositions constituting the requirements specification do not include a combination in which the requirements specification is true, the requirements specification input unit 3 assumes that the requirements specification B is contradictory.

The requirements specification conversion unit 6 generates an automaton, based on the requirements specification B input from the requirements specification input unit 3. The automaton is a state transition machine expressed by a set of five elements, namely a state set, an initial state, an input set, a transition function, and an accepting state. The automaton can be generated by inputting the requirements specification to an existing tool, such as SCHECK 2 or Rabinizer 3, for example, and all of the languages accepted in the generated automaton satisfy the requirements specification.

The control law derivation unit 4 generates a product automaton, using the automaton based on the requirements specification B and the transition system. The product automaton is a state transition machine expressed by a set of five elements, namely a state set, an initial state, an input set, a transition function, and an accepting state. A method of generating the product automaton will be described later.

The state transitions of the product automaton simultaneously express the state transitions of the transition system and the state transitions of the automaton, and the state transitions accepted in the product automaton correspond to the state transitions when the transition system satisfies the requirements specification.

Thus, by obtaining paths for allowing reaching from the initial state to the accepting state in the product automaton, a function (control law) for associating the states of the target to be controlled and the input signals from the controller can be derived, such that the state transition of the target to be controlled satisfies the requirements specification B.

The program generation unit 5 generates a program to be executed in the controller, based on the derived control law.

<Operation of Program Generation Apparatus>

Next, operations in each of the functional units will be described. Here, as the example, the design information A of the target to be controlled is input to the design information input unit 1 in a format of a timed Petri net.

The Petri net is a type of directed graph, and includes two types of nodes referred to as places and transitions, and edges referred to as arcs. Each place and each transition are connected with an arc, and the arc has a weight. Here, for the sake of simplicity, it is assumed that all the weights are 1. Each place may be assigned a mark referred to as a token, and a distribution of all of the tokens in the Petri net is referred to as a marking. Further, the marking in the initial state is referred to as an initial marking.

When there is an arc connecting from a place p to a transition t, the place p is referred to as an input place of the transition t. Further, when there is an arc connecting from the transition t to the place p, the place p is referred to as an output place of the transition t. The input place and the output place may each be a set.

The transition is fireable when there are tokens in all of its input places, and when the transition fires, the transition removes the tokens from the input places and adds the tokens to the output places. A marking that appears as a result of firing of a fireable transition from the initial marking is referred to as a reachable marking.

A machine can be modeled, on an assumption that the place in the Petri net is regarded as a state and the transition therein is regarded as a control signal.

FIG. 2 is a diagram illustrating an example of a case for modeling a pusher apparatus. In FIG. 2, each circle represents a place, and each rectangle represents a transition. Further, each arrow represents an arc, and a numerical value denoted alongside each arrow represents a weight. Further, a dot present inside one circle represents a token.

In FIG. 2, a state in which a pusher is pushed out is considered a place P0, a state in which the pusher is retracted is considered a place P1, a signal for pushing out the pusher is considered a transition T0, and a signal for retracting the pusher is considered a transition T1.

When a token is present in the place, it is indicated that the device is also in a corresponding state. In FIG. 2, it is indicated that the pusher apparatus is in a state in which its pusher is pushed out.

The timed Petri net is a model in which firing duration is added to the transition in the Petri net, and firing of the transition continues for certain predetermined time. In the timed Petri net, when the transition fires, the token is removed from the input place of the transition at the time of start of the firing, and then after the elapse of the firing duration, the token is added to the output place of the transition at the time of end of the firing.

In modeling of the pusher apparatus in the timed Petri net, regarding the transition T0 and the transition T1, respectively, time taken for a change from the state in which the pusher is retracted to the state in which the pusher is pushed out and time taken for a change from the state in which the pusher is pushed out to the state in which the pusher is retracted are the firing duration.

The requirements specification B is described using syntactically co-safe LTL (scLTL), which is a subclass of linear temporal logic (LTL).

The property satisfied by the state of the target to be controlled and the requirements specification are described using a proposition related to a relationship between the place and the token in the Petri net. The proposition is, for example, "a token is present in the place P0", and in the example of the pusher apparatus, the proposition indicates "a state in which the pusher is pushed out".

The design information conversion unit 2 converts the input design information A of the target to be controlled in a format of the transition system. The transition system is expressed by a set of five elements, namely a state set, an input set, a transition function, an observed value, and an observation mapping.

The state set is a set of all the markings that can be reached as a result of any number of times of firings of the transitions from the initial marking of the timed Petri net. The input set is a union of the transitions and an empty set. The empty set refers to a case in which none of the transitions fires.

The transition function is represented by a mapping from a Cartesian product of the state set and the input set to the state set, and indicates a post-transition state when the inputs of the input set are added to the states of the state set. A post-transition state x' of a state x due to an input σ may be expressed in the following expression, with use of a transition function δ.

$$x'=\delta(x,\sigma) \quad \text{[Expression 1]}$$

When the design information A of the target to be controlled is converted from a format of the timed Petri net to a format of the transition system, the transition function indicates, in the markings included in the state set, to which marking included in the state set a transition is to be performed due to firing of the transition included in the input set.

The observed value is a power set of propositions. The observation mapping is a rule for associating a set of propositions satisfied by respective states with the states included in the state set, and is represented by a mapping from the state set to the observed values.

The requirements specification conversion unit 6 converts the input requirements specification B to a finite state automaton. It is known that a specification described in a format of scLTL can be converted into a finite state automaton. This is described in "O. Kupferman and M. Y. Vardi: Model Checking of Safety Properties, Formal Methods in System Design, 19:291-314 (2001)", for example.

Note that, even if a specification is not described in a format of scLTL, a specification described using a temporal logic formula can be converted into an automaton. Thus, a specification not described in a format of scLTL can also be similarly converted.

The finite state automaton is a state transition machine expressed by a set of five elements, namely a state set, an initial state, an input set, a transition function, and an accepting state. The input set is the observed values of the transition system described above. A post-transition state s' of a state s due to an input o1 may be expressed in the following expression, with use of a transition function δA.

$$s'=\delta A(s,o1) \quad \text{[Expression 2]}$$

According to the above expression, the finite state automaton performs state transition, with its input being the observed values observed as a result of state transition of the transition system. Accordingly, by determining whether a sequence of observed values observed as a result of state transition of the transition system is accepted in the finite state automaton, whether the state transition of the transition system satisfies the requirements specification can be determined.

The control law derivation unit 4 generates a product automaton using the transition system and the finite state automaton, and further derives a control law. The product automaton is an automaton (state transition machine) expressed by a set of five elements, namely a state set, an initial state, an input set, a transition function, and an accepting state, each of which element is as follows.

The state set is a Cartesian product set of the state set of the transition system and the state set of the finite state automaton. The initial state is a Cartesian product set of the initial state of the transition system and the initial state of the finite state automaton.

The input set is the same as the input set of the transition system. The transition function is expressed by an expression to be described later, and indicates transition between the states included in the state set of the product automaton due to the inputs included in the input set of the product automaton. The accepting state is a Cartesian product set of the state set of the transition system and the accepting state of the finite state automaton.

In a state (x, s) of the product automaton, a transition function δP representing a post-transition state (x', s') when the input a is added may be expressed in the following expression.

$$\delta P((x,s),\sigma)=(\delta(x,\sigma),\delta A(s,o(x))) \quad \text{[Expression 3]}$$

Here, x represents the state of the transition system, δ represents the transition function of the transition system, and o represents the observation mapping of the transition system. Further, s represents the state of the automaton, and δA represents the transition function of the automaton.

An input sequence accepted in the product automaton generated as described above is an input sequence that ensures that the target to be controlled operates in a manner of satisfying the requirements specification, and the state reached due to the input sequence corresponds to a state of the target to be controlled that has transitioned due to the input sequence.

Thus, by obtaining paths for allowing reaching from the initial state of the product automaton to the accepting state, the state transition when the target to be controlled satisfies the requirements specification B and the input sequence necessary for the transition can be obtained.

Based on the above, a function (control law) for associating the states of the target to be controlled and the inputs from the controller can be derived, such that the target to be controlled satisfies the requirements specification B.

Figure 3:
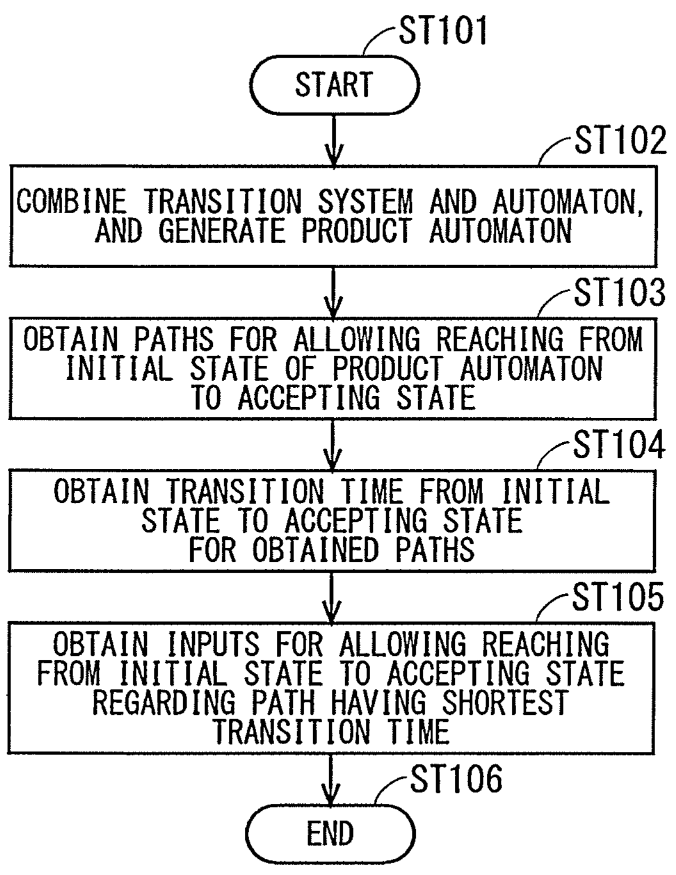
FIG. 3 is a flowchart illustrating an example of an operation of a control law derivation unit.

FIG. 3 is a flowchart illustrating an example of an operation in the control law derivation unit 4. As illustrated in FIG. 3, in Step ST101, the control law derivation unit 4 waits to receive input of the transition system from the design information conversion unit 2 and input of the finite state automaton from the requirements specification conversion unit 6, and then starts the operation.

Subsequently, in Step ST102, the control law derivation unit 4 combines the transition system input from the design information conversion unit 2 and the finite state automaton input from the requirements specification conversion unit 6, and generates a product automaton.

Subsequently, in Step ST103, the control law derivation unit 4 obtains paths for allowing reaching from the initial state of the product automaton to the accepting state. A detailed flow will be described later with reference to FIG. 4.

Subsequently, in Step ST104, the control law derivation unit 4 obtains transition time from the initial state to the accepting state for each of the paths obtained in Step ST103. A detailed flow will be described later with reference to FIG. 5.

Subsequently, in Step ST105, the control law derivation unit 4 obtains inputs for allowing reaching from the initial state to the accepting state regarding the path having the shortest transition time obtained in Step ST104, and derives a correlation between respective states and the inputs as a control law.

Subsequently, in Step ST106, the control law derivation unit 4 ends the operation.

Next, the detailed flow of Step ST103 will be described with reference to FIG. 4. Note that FIG. 4 is a flowchart illustrating an example of a path derivation operation in the control law derivation unit 4.

Figure 4:
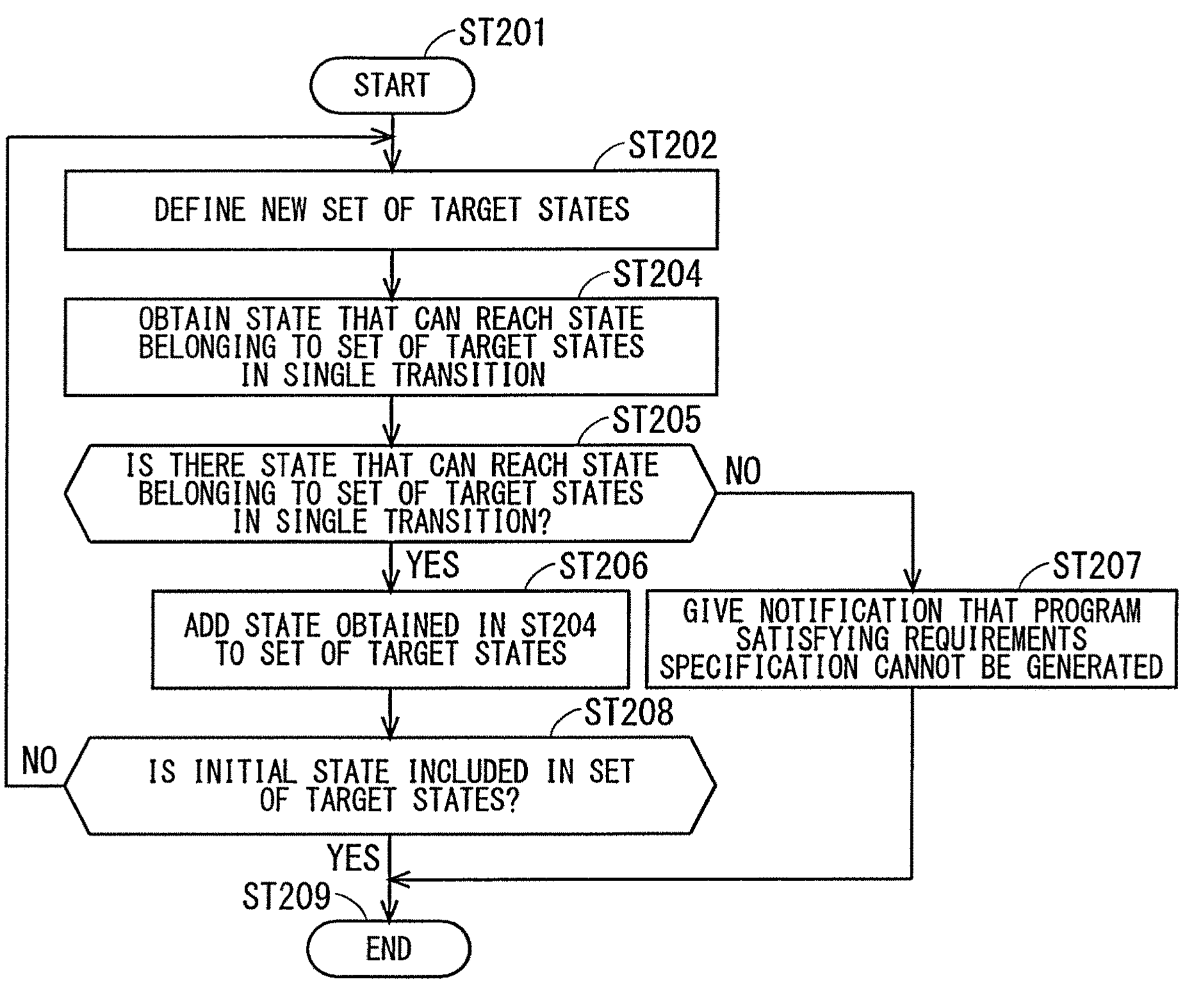
FIG. 4 is a flowchart illustrating an example of a path derivation operation in the control law derivation unit.

As illustrated in FIG. 4, in Step ST201, the control law derivation unit 4 waits to receive input of the product automaton, and then starts the path derivation operation.

Subsequently, in Step ST202, the control law derivation unit 4 defines a new set of target states. The set of target states is a set of states in which transitions allowing reaching the accepting state are present, and is, initially, a set (empty set) of accepting states only.

Subsequently, in Step ST204, the control law derivation unit 4 obtains a state that can reach the state belonging to the set of target states in a single transition.

Subsequently, in Step ST205, the control law derivation unit 4 determines whether or not such a state that can reach the state belonging to the set of target states in a single transition is present in Step ST204. Then, when such a state is present, that is, in a case corresponding to "YES" branching from Step ST205 illustrated in FIG. 4, the operation proceeds to Step ST206 illustrated in FIG. 4. In contrast, when such a state is not present, that is, in a case corresponding to "NO" branching from Step ST205 illustrated in FIG. 4, the operation proceeds to Step ST207 illustrated in FIG. 4.

In Step ST206, the control law derivation unit 4 adds the state obtained in Step ST204 to the set of target states. Then, the operation proceeds to Step ST208.

In Step ST207, the control law derivation unit 4 notifies a user that the control law derivation unit 4 cannot generate a program satisfying the requirements specification for the reason that the state that can reach the set of target states is not present. Then, the operation proceeds to Step ST209, and the path derivation operation ends.

In Step ST208, the control law derivation unit 4 determines whether the initial state is included in the set of target states. Then, when the initial state is included, that is, in a case corresponding to "YES" branching from Step ST208 illustrated in FIG. 4, the operation proceeds to Step ST209 illustrated in FIG. 4, and the path derivation operation ends. In contrast, when the initial state is not included, that is, in a case corresponding to "NO" branching from Step ST208 illustrated in FIG. 4, the operation returns to Step ST202 illustrated in FIG. 4.

Next, the detailed flow of Step ST104 will be described with reference to FIG. 5. Note that FIG. 5 is a flowchart illustrating an example of a transition time calculation operation in the control law derivation unit 4.

Figure 5:
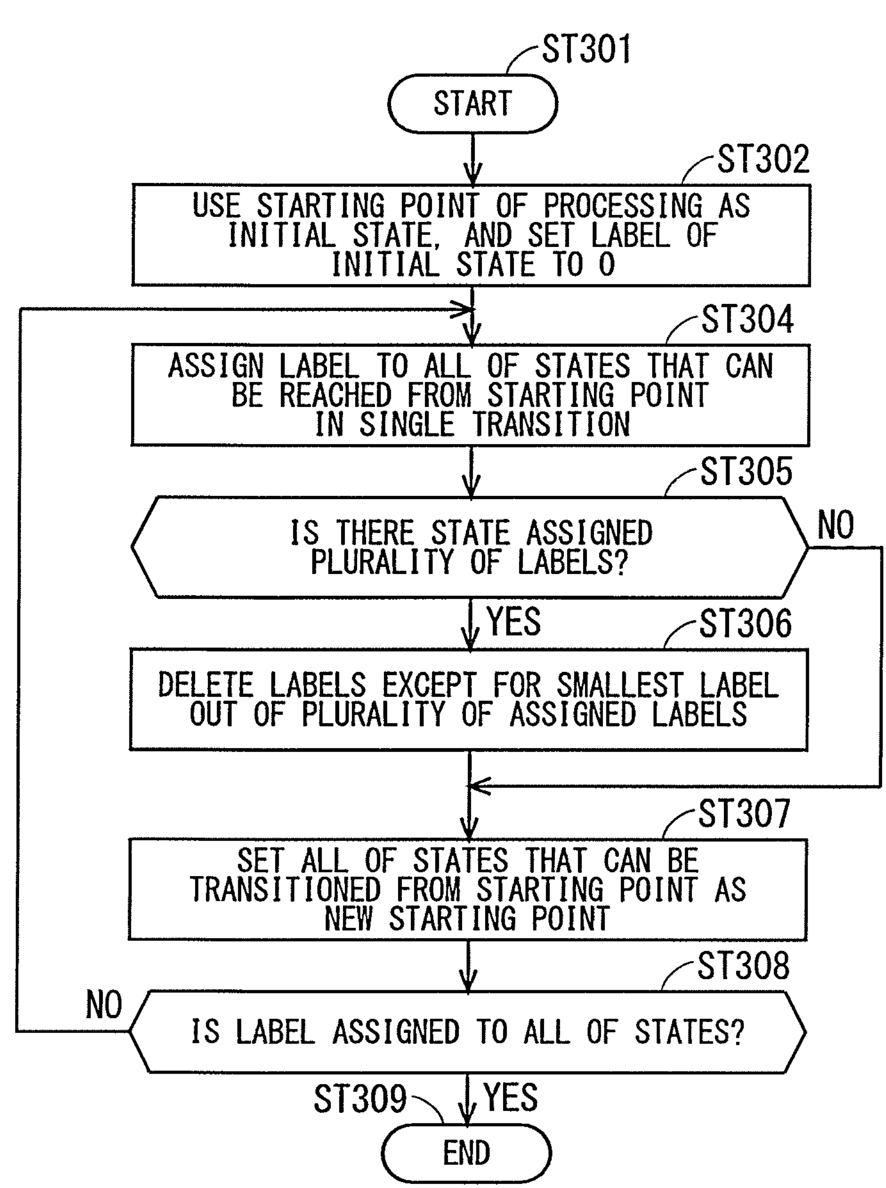
FIG. 5 is a flowchart illustrating an example of a transition time calculation operation in the control law derivation unit.

As illustrated in FIG. 5, in Step ST301, the control law derivation unit 4 waits to receive input of the product automaton in which only paths allowing reaching the accepting state are defined, and then starts the transition time calculation operation.

Subsequently, in Step ST302, the control law derivation unit 4 uses a starting point of processing as the initial state, and sets a label of the initial state to 0. In the following processing, the starting point may be a set.

Subsequently, in Step ST304, the control law derivation unit 4 assigns, to all of the states that can be reached from the starting point in a single transition, the sum of the label of the starting point and time required for the transition, as a label. When the starting point is a set, the same processing is performed to all of the states included in the set.

Subsequently, in Step ST305, the control law derivation unit 4 determines whether or not a state assigned a plurality of labels is present. Then, when such a state assigned a plurality of labels is present, that is, in a case corresponding to "YES" branching from Step ST305 illustrated in FIG. 5, the operation proceeds to Step ST306 illustrated in FIG. 5. In contrast, when such a state assigned a plurality of labels is not present, that is, in a case corresponding to "NO" branching from Step ST305 illustrated in FIG. 5, the operation proceeds to Step ST307 illustrated in FIG. 5.

In Step ST306, the control law derivation unit 4 deletes labels except for the smallest label out of the plurality of assigned labels. When there are a plurality of smallest labels, only one is maintained. Then, the operation proceeds to Step ST307.

Subsequently, in Step ST307, the control law derivation unit 4 sets all of the states that can be transitioned from the starting point as a new starting point.

Subsequently, in Step ST308, the control law derivation unit 4 determines whether or not a label is assigned to all of the states. Then, when a label is assigned to all of the states, that is, in a case corresponding to "YES" branching from Step ST308 illustrated in FIG. 5, the operation proceeds to Step ST309 illustrated in FIG. 5, and the transition time calculation operation ends. In contrast, when a label is not assigned to all of the states, that is, in a case corresponding to "NO" branching from Step ST308 illustrated in FIG. 5, the operation returns to Step ST304 illustrated in FIG. 5.

According to the above flow, a control law optimized regarding time is obtained in the control law derivation unit 4. Therefore, control signals to be input from the controller regarding the respective states of the target to be controlled can be determined, such that the target to be controlled satisfies the requirements specification and control time of the target to be controlled is minimized.

The program generation unit 5 generates a control program to be executed in the controller, with its input being the control law from the control law derivation unit 4. Because the signals to be input from the controller to the target to be controlled can be associated with the respective states of the target to be controlled owing to the control law, such a program is generated that repeatedly executes a series of processing of first observing the states of the target to be controlled, then calculating the control signals based on the control law, and then outputting the control signals to the target to be controlled. Owing to the program, control can be performed such that the target to be controlled satisfies the requirements specification and control time of the target to be controlled is minimized.

A language of the generated program can be selected by a user as appropriate. As types of languages, for example, five languages defined in IEC 61131-3 used for creating a sequence program or a general-purpose language such as C/C++ may be considered. However, any type of language may be used, on the condition that the language is capable of describing the above processing.

The present embodiment enables generation of a program for satisfying the requirements specification for the target to be controlled and minimizing control time of the target to be controlled, of which language is not restricted.

Note that, in the present embodiment, even if the requirements specification conversion unit 6 is not provided, the control law can be derived by modifying the processing of the control law derivation unit 4 as follows.

In other words, in the control law derivation unit 4, a directed graph describing all the states that can be reached from the initial state is generated regarding the input transition system, on an assumption that each state is regarded as a node and each transition is regarded as an edge.

Then, of all of the paths starting from the initial state in the generated directed graph, paths allowing satisfaction of a given requirements specification and reaching to the target state in minimum transition time are selected, and the control law can be thereby derived.

In this case as well, effects similar to those when the requirements specification conversion unit 6 is provided can be achieved, but processing time required to derive the control law may be longer than that in the configuration using the requirements specification conversion unit 6.

Second Embodiment

A program generation apparatus and a program generation method according to the present embodiment will be described. Note that, in the following description, constituent elements similar to the constituent elements described in the embodiment described above are denoted by the same reference signs in the drawings, and detailed description thereof will be omitted as appropriate.

<Configuration of Program Generation Apparatus>

Figure 6:
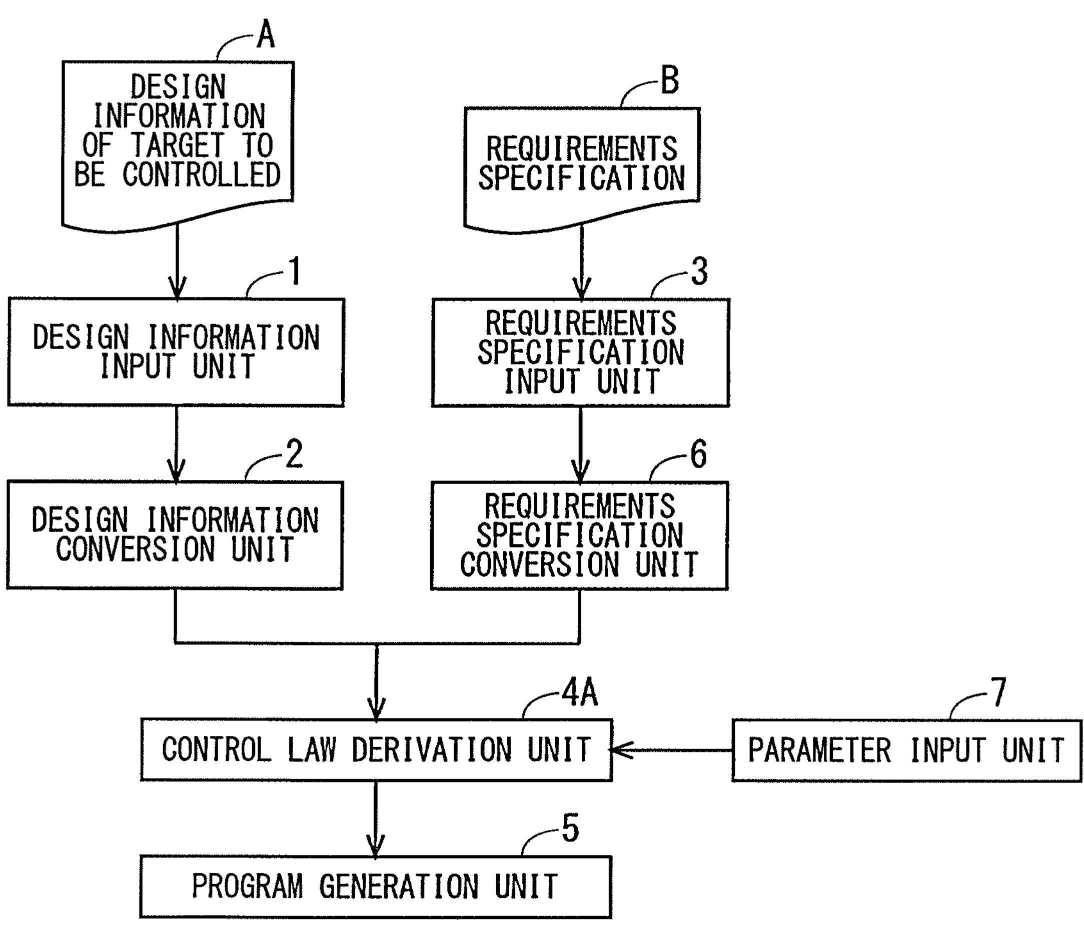
FIG. 6 is a diagram conceptually illustrating an example of a configuration of a program generation apparatus according to an embodiment.

FIG. 6 is a diagram conceptually illustrating an example of a configuration of the program generation apparatus according to the present embodiment. In the configuration illustrated in FIG. 6, the program generation apparatus includes the design information input unit 1, the design information conversion unit 2, the requirements specification input unit 3, a control law derivation unit 4A, the program generation unit 5, the requirements specification conversion unit 6, and a parameter input unit 7. The control law derivation unit 4A generates a product automaton, using the transition system and the automaton.

The parameter input unit 7 receives, from a user or the like, input of a parameter (an integer value K, which is 1 or greater and is equal to or less than the smallest number of steps taken from the initial state to the accepting state) being a threshold related to control law derivation time in the control law derivation unit 4A. The parameter input unit 7 limits the states of the device to be assigned a label within a range corresponding to the parameter.

The difference from the case illustrated in the first embodiment lies in a flow corresponding to Step ST104 in FIG. 3 (in particular, processing of obtaining paths with minimum transition time out of the paths for allowing reaching from the initial state to the accepting state in the product automaton). In the present embodiment, processing using the integer value K input to the parameter input unit 7 is performed.

Next, a flow corresponding to Step ST104 above will be described with reference to FIG. 7. Note that FIG. 7 is a flowchart illustrating an example of a transition time calculation operation in the control law derivation unit 4A.

Figure 7:
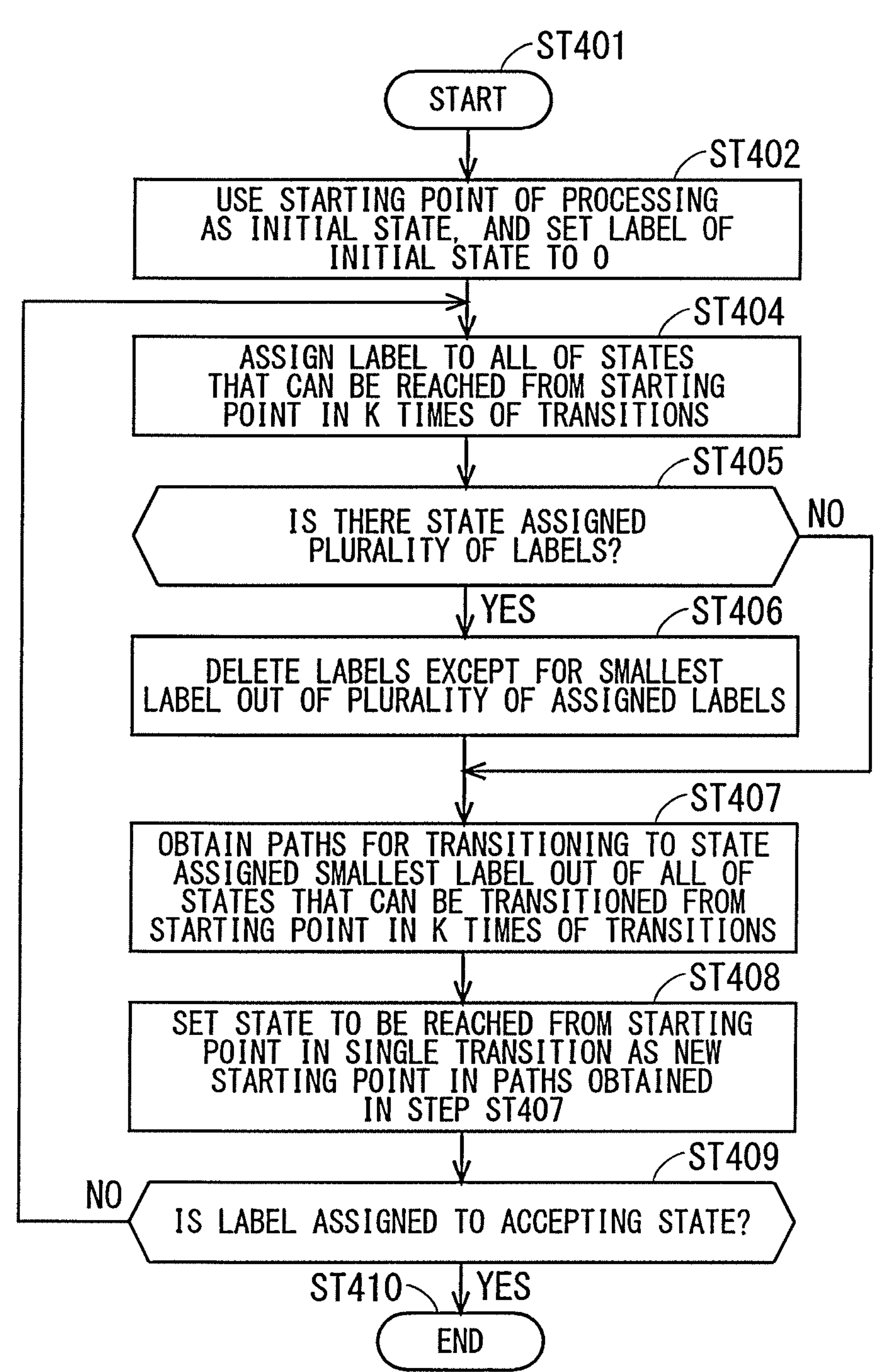
FIG. 7 is a flowchart illustrating an example of a transition time calculation operation in a control law derivation unit.

As illustrated in FIG. 7, in Step ST401, the control law derivation unit 4A waits to receive input of the product automaton in which only paths allowing reaching the accepting state are defined, and then starts the transition time calculation operation.

Subsequently, in Step ST402, the control law derivation unit 4A uses a starting point of processing as the initial state, and sets a label of the initial state to 0.

Subsequently, in Step ST404, with use of the integer value K being a threshold input to the parameter input unit 7 in advance, the control law derivation unit 4A assigns, to all of the states that can be reached from the starting point in K times of transitions, the sum of the label of the starting point and time required for the K times of transitions, as a label.

Subsequently, in Step ST405, the control law derivation unit 4A determines whether or not a state assigned a plurality of labels is present. Then, when such a state assigned a plurality of labels is present, that is, in a case corresponding to "YES" branching from Step ST405 illustrated in FIG. 7, the operation proceeds to Step ST406 illustrated in FIG. 7. In contrast, when such a state assigned a plurality of labels is not present, that is, in a case corresponding to "NO" branching from Step ST405 illustrated in FIG. 7, the operation proceeds to Step ST407 illustrated in FIG. 7.

In Step ST406, the control law derivation unit 4A deletes labels except for the smallest label out of the plurality of assigned labels. When there are a plurality of smallest labels, only one is maintained. Then, the operation proceeds to Step ST407.

Subsequently, in Step ST407, the control law derivation unit 4A obtains paths for transitioning to the state assigned the smallest label out of all of the states that can be transitioned from the starting point in the K times of transitions.

Subsequently, in Step ST408, the control law derivation unit 4A sets the state to be reached from the starting point in a single transition as a new starting point in the paths obtained in Step ST407.

Subsequently, in Step ST409, the control law derivation unit 4A determines whether or not a label is assigned to the accepting state. Then, when a label is assigned to the accepting state, that is, in a case corresponding to "YES" branching from Step ST409 illustrated in FIG. 7, the operation proceeds to Step ST410 illustrated in FIG. 7, and the transition time calculation operation ends. In contrast, when a label is not assigned to the accepting state, that is, in a case corresponding to "NO" branching from Step ST409 illustrated in FIG. 7, the operation returns to Step ST404 illustrated in FIG. 7.

In comparison to the processing of the control law derivation unit 4 in the first embodiment, the processing of the control law derivation unit 4A in the present embodiment does not require assignment of a label to all of the states of the product automaton. This reduces the processing time required to derive the control law.

However, because this is an operation of assigning a label to only limited states of the product automaton, the label assigned to the accepting state may be larger than that when a label is assigned to all of the states. This means that execution time of an ultimately obtained program may be longer than execution time of the program obtained in the first embodiment.

In addition, in the above case, depending on the integer value K set in the parameter input unit 7, a degree of its influence varies. When the integer value K is large, although the effect of reducing the processing time is small, it is likely that the execution time of an obtained program is further reduced (the execution time, however, cannot be shorter than the execution time of the program obtained in the first embodiment). In contrast, when the integer value K is small, although the effect of reducing the processing time is large, it is likely that the execution time of an obtained program is further increased.

Thus, by adjusting the integer value K to be set in the parameter input unit 7, a user can obtain a program with allowable execution time in a short period of time.

Third Embodiment

A program generation apparatus and a program generation method according to the present embodiment will be described. Note that, in the following description, constituent elements similar to the constituent elements described in the embodiment described above are denoted by the same reference signs in the drawings, and detailed description thereof will be omitted as appropriate.

<Configuration of Program Generation Apparatus>

Figure 8:
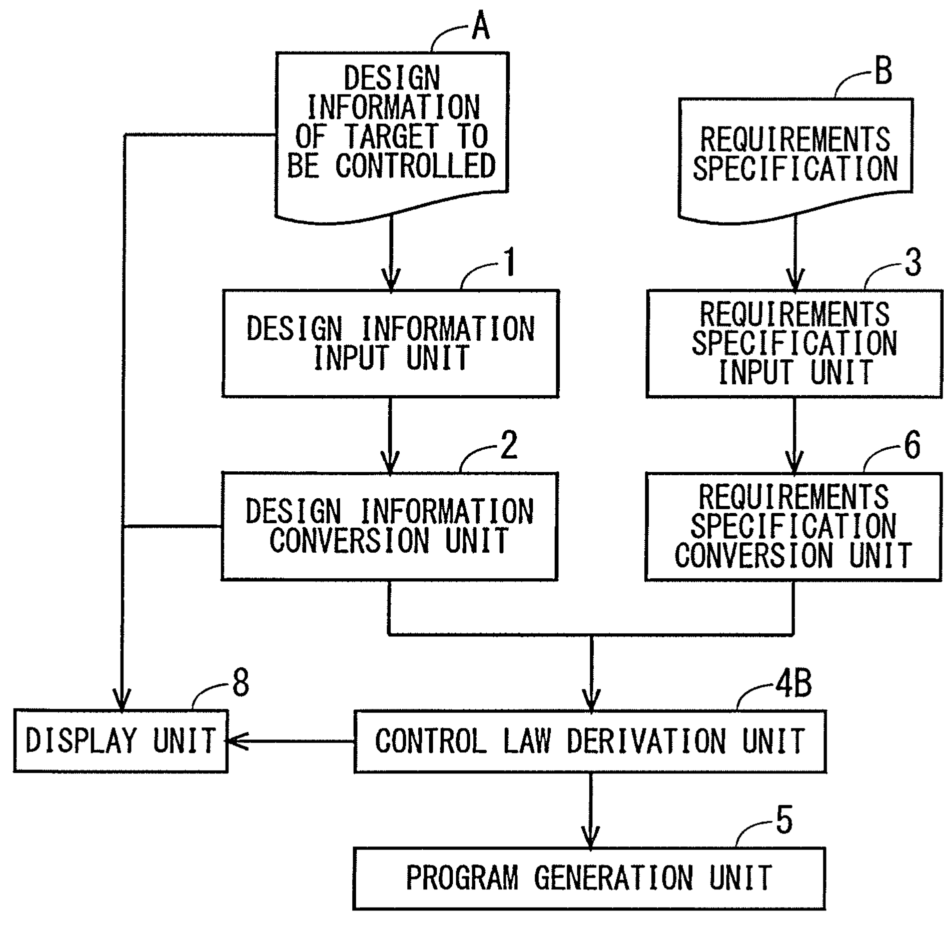
FIG. 8 is a diagram conceptually illustrating an example of a configuration of a program generation apparatus according to an embodiment.

FIG. 8 is a diagram conceptually illustrating an example of a configuration of the program generation apparatus according to the present embodiment. In the configuration illustrated in FIG. 8, the program generation apparatus includes the design information input unit 1, the design information conversion unit 2, the requirements specification input unit 3, a control law derivation unit 4B, the program generation unit 5, the requirements specification conversion unit 6, and a display unit 8. The control law derivation unit 4B generates a product automaton, using the transition system and the automaton.

The display unit 8 displays an external appearance of the target to be controlled, an operation of the target to be controlled, and a property satisfied by each of the states of the target to be controlled, based on information of the transition system generated in the design information conversion unit 2, the design information A of the target to be controlled, and the control law. This enables checking of an operation when the target to be controlled is controlled in accordance with the control law derived in the control law derivation unit 4B, correction of the requirements specification B while checking the operation of the target to be controlled, or the like.

The display unit 8 can be implemented with a 3D simulator or the like, for example. The external appearance of the target to be controlled displayed in the display unit 8 can be generated by converting the design information A of the target to be controlled.

The operation of the target to be controlled can be displayed by using the transition system generated in the design information conversion unit 2. According to the definition of the states of the transition system, the states of the target to be controlled and the states of the transition system can be associated with each other, and thus the current states of the transition system and the states of the target to be controlled associated therewith can be displayed in the display unit 8.

Further, according to the definition of the transition function, the post-transition state and the transition time when each of the inputs included in the input set is provided in each of the states included in the state set can be derived, and thus the post-transition state and the transition time when each of the control signals is input in each of the states of the target to be controlled can be derived. By displaying these in association with the external appearance of the target to be controlled in the display unit 8, the operation of the target to be controlled can be displayed.

Further, in the transition system, the observation mapping is also defined, and thus the property satisfied by each of the states of the target to be controlled can also be displayed in the display unit 8. This enables a user to correct the requirements specification B while checking the property satisfied by each of the states of the target to be controlled.

According to the present embodiment, the user can check the external appearance, the operation, and the like of the target to be controlled as appropriate. This allows for checking of the operation when the target to be controlled is controlled, modification of the requirements specification, or the like, with use of the generated program. As a result, the user can easily obtain a desired program.

Fourth Embodiment

A program generation apparatus and a program generation method according to the present embodiment will be described. Note that, in the following description, constituent elements similar to the constituent elements described in the embodiment described above are denoted by the same reference signs in the drawings, and detailed description thereof will be omitted as appropriate.

The present embodiment has an object to generate a program for causing the target to be controlled to operate as desired by a user without describing the whole of the requirements specification B for the target to be controlled.

<Configuration of Program Generation Apparatus>

Figure 9:
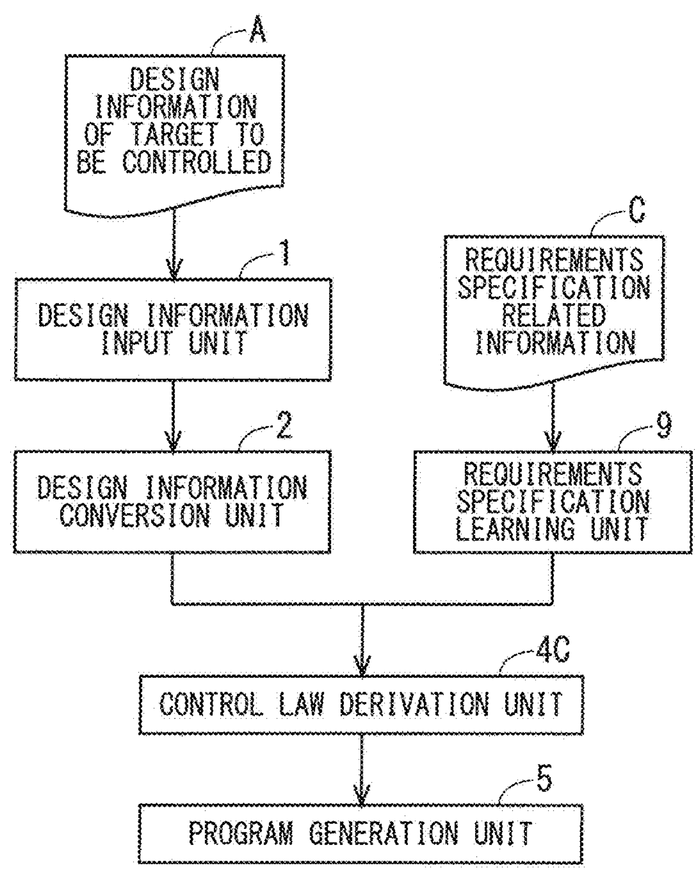
FIG. 9 is a diagram conceptually illustrating an example of a configuration of a program generation apparatus according to an embodiment.

FIG. 9 is a diagram conceptually illustrating an example of a configuration of the program generation apparatus according to the present embodiment. In the configuration illustrated in FIG. 9, the program generation apparatus includes the design information input unit 1, the design information conversion unit 2, a control law derivation unit 4C, the program generation unit 5, and a requirements specification learning unit 9 that performs learning based on requirements specification related information C. The control law derivation unit 4C generates a product automaton, using the transition system and an automaton output from the requirements specification learning unit 9.

The requirements specification related information C is information including examples of state transitions of the device being the target to be controlled satisfying the requirements specification B and examples of states into which the device being the target to be controlled is not to fall (that is, state transitions of the device not satisfying the requirements specification B), and is information that can be input or added, for example, as appropriate by the user, in response to a request from the requirements specification learning unit 9.

The requirements specification learning unit 9 learns an automaton that accepts only input sequences that satisfy the requirements specification B, based on the requirements specification related information C, by using a learning automaton method or a learning method such as reinforcement learning.

The following will describe an automaton learning method of a case using the Angluin's L* algorithm as the learning method in the requirements specification learning unit 9, for example.

The details of the Angluin's L* algorithm are described in "Dana Angluin: Learning Regular Sets from Queries and Counterexamples. Information and Computation 75, 87-106 (1987)", for example.

The L* algorithm is an algorithm for learning an automaton that accepts an unknown language L, using the following queries.

The queries include two types of queries, namely a membership query and an equivalence query. The membership query is for making an inquiry as to whether or not a certain input sequence belongs to an unknown language L. The equivalence query is for making an inquiry as to whether or not an automaton output in processing of the L* algorithm is the same as an automaton that accepts the unknown language L, and for inquiring a counterexample if those automata are not the same.

In the processing of the L* algorithm, the requirements specification learning unit 9 requests answers to the queries from the user at a necessary timing and obtains answers to the queries from the user, and thereby learns the automaton that accepts the unknown language L and outputs the automaton.

When answers to the queries are requested from the user, details of the request and the like may be displayed using the display unit 8 as illustrated in FIG. 8, although not illustrated in FIG. 9. In this case, when an answer to the membership query is requested, an operation of the target to be controlled corresponding to an input sequence may be displayed in the display unit 8 to conduct a check as to whether the operation does not deviate from the operation of the target to be controlled as desired by the user. When an answer to the equivalence query is requested, operations of the target to be controlled corresponding to a plurality of input sequences accepted in the automaton learning in the L* algorithm may be displayed in the display unit 8 to conduct a check as to whether the target to be controlled operates as desired by the user.

Figure 10:
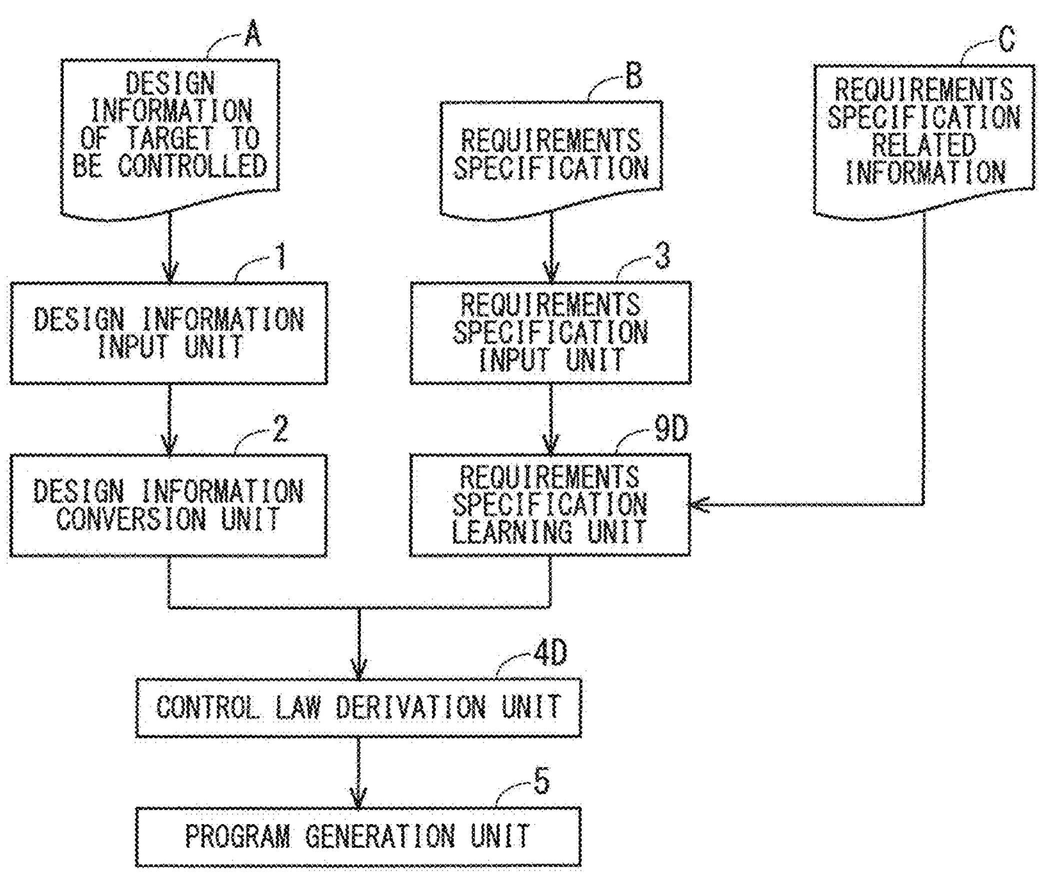
FIG. 10 is a diagram conceptually illustrating a modification of the configuration of the program generation apparatus according to the embodiment.

To the requirements specification learning unit 9, a part of the requirements specification B for the target to be controlled may be further input. FIG. 10 is a diagram conceptually illustrating a modification of the configuration of the program generation apparatus according to the present embodiment.

In the configuration illustrated in FIG. 10, the program generation apparatus includes the design information input unit 1, the design information conversion unit 2, a control law derivation unit 4D, the program generation unit 5, the requirements specification input unit 3, and a requirements specification learning unit 9D that performs learning based on the requirements specification B and the requirements specification related information C. The control law derivation unit 4D generates a product automaton, using the transition system and an automaton output from the requirements specification learning unit 9D.

As illustrated in FIG. 10, to the requirements specification learning unit 9D, a part of the requirements specification B is input from the requirements specification input unit 3, and the requirements specification related information C is further input. When the requirements specification learning unit 9D can generate answers to the queries using the input part of the requirements specification B, the requirements specification learning unit 9D need not necessarily request an answer from the user. This can reduce time and efforts taken by the user to answer the queries.

According to the present embodiment, even if the user cannot describe the requirements specification B completely, a program for causing the target to be controlled to operate as desired by the user can be generated.

Note that both of the parameter input unit 7 illustrated in FIG. 6 and the display unit 8 illustrated in FIG. 8 can also be applied to the control law derivation unit of the present embodiment.

<Hardware Configuration of Program Generation Apparatus>

Figure 12:
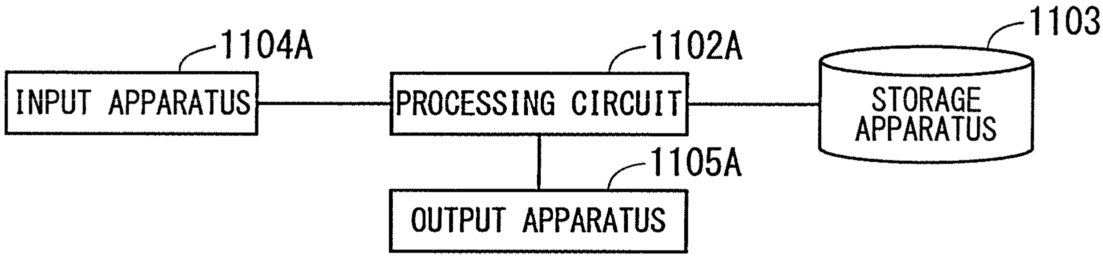
FIG. 12 is a diagram schematically illustrating a hardware configuration of a case in which the program generation apparatus illustrated in FIG. 1, FIG. 6, FIG. 8, FIG. 9.
Figure 13:
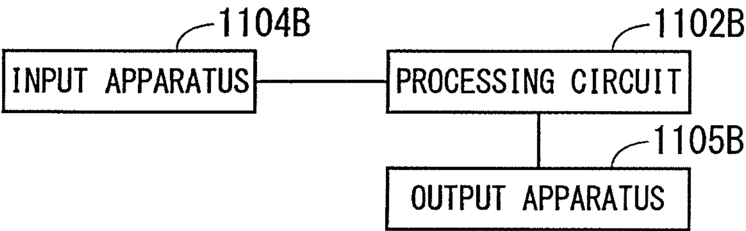
FIG. 13 is a diagram schematically illustrating a hardware configuration of a case in which the program generation apparatus illustrated in FIG. 1, FIG. 6, FIG. 8, FIG. 9.

FIG. 12 and FIG. 13 are each a diagram schematically illustrating a hardware configuration of a case in which the program generation apparatus illustrated in FIG. 1, FIG. 6, FIG. 8, FIG. 9, and FIG. 10 is actually put into operation.

Note that the number and the like of hardware configurations illustrated in FIG. 12 and FIG. 13 may not match those of the configurations illustrated in FIG. 1, FIG. 6, FIG. 8, FIG. 9, and FIG. 10. This is because the configurations illustrated in FIG. 1, FIG. 6, FIG. 8, FIG. 9, and FIG. 10 represent conceptual units.

Thus, a case in which one configuration illustrated in FIG. 1, FIG. 6, FIG. 8, FIG. 9, and FIG. 10 consists of a plurality of hardware configurations illustrated in FIG. 12 and FIG. 13, a case in which one configuration illustrated in FIG. 1, FIG. 6, FIG. 8, FIG. 9, and FIG. 10 corresponds to a part of the hardware configuration illustrated in FIG. 12 and FIG. 13, and a case in which a plurality of configurations illustrated in FIG. 1, FIG. 6, FIG. 8, FIG. 9, and FIG. 10 are included in one hardware configuration illustrated in FIG. 12 and FIG. 13 may be at least assumed.

In FIG. 12, as hardware configurations for implementing the design information input unit 1, the design information conversion unit 2, the requirements specification input unit 3, the control law derivation unit 4, the program generation unit 5, the requirements specification conversion unit 6, the parameter input unit 7, the display unit 8, the requirements specification learning unit 9, and the like in FIG. 1, FIG. 6, FIG. 8, FIG. 9, and FIG. 10, a processing circuit 1102A that performs computation, a storage apparatus 1103 that can store information, an input apparatus 1104A that can input information, such as a mouse, a keyboard, a touch panel, or various types of switches, and an output apparatus 1105A (which may be shared by the input apparatus 1104A) that can output information, such as a display, a liquid crystal display apparatus, or a lamp, are illustrated. These configurations are the same in other embodiments as well.

In FIG. 13, as hardware configurations for implementing the design information input unit 1, the design information conversion unit 2, the requirements specification input unit 3, the control law derivation unit 4, the program generation unit 5, the requirements specification conversion unit 6, the parameter input unit 7, the display unit 8, the requirements specification learning unit 9, and the like in FIG. 1, FIG. 6, FIG. 8, FIG. 9, and FIG. 10, a processing circuit 1102B that performs computation, an input apparatus 1104B that can input information, such as a mouse, a keyboard, a touch panel, or various types of switches, and an output apparatus 1105B (which may be shared by the input apparatus 1104B) that can output information, such as a display, a liquid crystal display apparatus, or a lamp, are illustrated. The configurations are the same in other embodiments as well.

The storage apparatus 1103 may be, for example, a hard disk drive (i.e., an HDD), a volatile or non-volatile semiconductor memory such as a random access memory (i.e., a RAM), a read only memory (i.e., a ROM), a flash memory, an erasable programmable read only memory (EPROM), and an electrically erasable programmable read-only memory (EEPROM), a memory (recording medium) including a magnetic disk, a flexible disk, an optical disc, a compact disc, a MiniDisc, a DVD, or the like, or any recording medium to be used in future.

The processing circuit 1102A may execute a program stored in the storage apparatus 1103, an external CD-ROM, an external DVD-ROM, an external flash memory, or the like. In other words, the processing circuit 1102A may be, for example, a central processing unit (i.e., a CPU), a microprocessor, a microcomputer, or a digital signal processor (i.e., a DSP).

When the processing circuit 1102A executes a program stored in the storage apparatus 1103, an external CD-ROM, an external DVD-ROM, an external flash memory, or the like, the design information conversion unit 2, the control law derivation unit 4, the program generation unit 5, the requirements specification conversion unit 6, and the requirements specification learning unit 9 are implemented by software, firmware, or a combination of software and firmware in which the program stored in the storage apparatus 1103 is executed by the processing circuit 1102A. Note that the functions of the design information conversion unit 2, the control law derivation unit 4, the program generation unit 5, the requirements specification conversion unit 6, and the requirements specification learning unit 9 may be, for example, implemented by a plurality of processing circuits cooperating with each other.

The software and the firmware may be described as a program and stored in the storage apparatus 1103. In that case, the processing circuit 1102A reads and executes the program stored in the storage apparatus 1103, and thereby implements the above functions. In other words, the storage apparatus 1103 may store a program to ultimately implement the above functions, when being executed by the processing circuit 1102A.

The processing circuit 1102B may be dedicated hardware. In other words, the processing circuit 1102B may be, for example, a single circuit, a composite circuit, a programmed processor, a parallel programmed processor, an integrated circuit (an application specific integrated circuit, i.e., an ASIC), a field-programmable gate array (FPGA), or a circuit combining these.

When the processing circuit 1102B is dedicated hardware, the design information conversion unit 2, the control law derivation unit 4, the program generation unit 5, the requirements specification conversion unit 6, and the requirements specification learning unit 9 are implemented when the processing circuit 1102B operates. Note that the functions of the design information conversion unit 2, the control law derivation unit 4, the program generation unit 5, the requirements specification conversion unit 6, and the requirements specification learning unit 9 may be implemented in different circuits, or may be implemented in a single circuit.

Note that the functions of the design information conversion unit 2, the control law derivation unit 4, the program generation unit 5, the requirements specification conversion unit 6, and the requirements specification learning unit 9 may be partially implemented in the processing circuit 1102A that executes the program stored in the storage apparatus 1103, and may be partially implemented in the processing circuit 1102B being dedicated hardware.

The design information input unit 1, the requirements specification input unit 3, and the parameter input unit 7 are implemented by the input apparatus 1104A or the input apparatus 1104B.

The display unit 8 is implemented by the output apparatus 1105A or the output apparatus 1105B (which may be shared by the input apparatus).

Effects Produced by Embodiments Described Above

Next, examples of effects produced by the embodiments described above will be described. Note that, in the following description, the effects will be described based on a specific configuration illustrated in the embodiments described above. However, the specific configuration may be replaced with another specific configuration illustrated in the specification of the present application, as long as similar effects are produced. In other words, in the following, for the sake of convenience, only one of specific corresponding configurations may be described as a representative example. However, the specific configuration described as the representative example may be replaced with another specific corresponding configuration.

The replacement may be performed across a plurality of embodiments. In other words, respective configurations illustrated in different embodiments may be combined together, in such a manner that similar effects are produced.

According to the embodiments described above, the program generation apparatus includes the design information conversion unit 2, the control law derivation unit 4 (or the control law derivation unit 4A, the control law derivation unit 4B, the control law derivation unit 4C, the control law derivation unit 4D), and the program generation unit 5. The design information conversion unit 2 converts the design information A into a model, which at least includes a state set being a set of states of a device, an input set being a set of signals input from a controller to a target to be controlled, a transition function being a function representing transitions between the states of the device included in the state set as caused due to the signals input to the target to be controlled, and time required for each of the transitions represented by the transition function. Note that the design information A at least includes a plurality of states of the device constituting the target to be controlled, respective relationships between signals input and output between the target to be controlled and the controller and the states of the device, and time required for each of changes of the states of the device. The control law derivation unit 4 derives a control law for respectively associating the states of the device and the signals input from the controller to the target to be controlled, based on a requirements specification B including a specification related to the time required for the transitions of the states of the device and the model, so as to satisfy the requirements specification B. The program generation unit 5 generates a program, based on the control law.

Further, according to the embodiments described above, the program generation apparatus includes the processing circuit 1102A that executes the program, and the storage apparatus 1103 that stores the program to be executed. When the processing circuit 1102A executes the program, the following operation is implemented.

In other words, the design information A, which at least includes a plurality of states of a device constituting the target to be controlled, respective relationships between signals input and output between a target to be controlled and a controller and the states of the device, and time required for each of changes of the states of the device, is converted into a model, which at least includes a state set being a set of states of the device, an input set being a set of signals input from the controller to the target to be controlled, a transition function being a function representing transitions between the states of the device included in the state set as caused due to the signals input to the target to be controlled, and time required for each of the transitions represented by the transition function. Then, a control law for respectively associating the states of the device and the signals input from the controller to the target to be controlled is derived, based on a requirements specification B including a specification related to the time required for the transitions of the states of the device and the model, so as to satisfy the requirements specification B. Then, a program is generated, based on the control law.

Further, according to the embodiments described above, the program generation apparatus includes the processing circuit 1102B being dedicated hardware. The processing circuit 1102B being dedicated hardware performs the following operation.

In other words, the processing circuit 1102B being dedicated hardware converts the design information A, which at least includes a plurality of states of a device constituting a target to be controlled, respective relationships between signals input and output between the target to be controlled and a controller and the states of the device, and time required for each of changes of the states of the device, into a model, which at least includes a state set being a set of states of the device, an input set being a set of signals input from the controller to the target to be controlled, a transition function being a function representing transitions between the states of the device included in the state set as caused due to the signals input to the target to be controlled, and time required for each of the transitions represented by the transition function. Then, the processing circuit 1102B being dedicated hardware derives a control law for respectively associating the states of the device and the signals input from the controller to the target to be controlled, based on a requirements specification B including a specification related to the time required for the transitions of the states of the device and the model, so as to satisfy the requirements specification B. Then, the processing circuit 1102B being dedicated hardware generates a program, based on the control law.

According to the configuration described above, the control law is derived based on the model including the time required for the transitions, so as to satisfy the requirements specification including the time required for the transitions. Therefore, control (optimization) related to time is performed in the program generated based on the control law, and operating efficiency of the target to be controlled can be thus enhanced. Further, a rule for converting the generated program is not limited to the ladder language. Therefore, a degree of freedom in converting a language of the program is enhanced.

Note that, also when another configuration illustrated in the specification of the present application is added to the above configuration as appropriate, that is, also when another configuration in the specification of the present application not referred to as the above configuration is added as appropriate, similar effects can be produced.

Further, according to the embodiments described above, the model includes a property satisfied by each of the states of the device. According to the configuration described above, the control law is derived based on the model including the time required for the transitions, so as to satisfy the requirements specification including the time required for the transitions. Therefore, control (optimization) related to time is performed in the program generated based on the control law, and operating efficiency of the target to be controlled can be thus enhanced. Further, a rule for converting the generated program is not limited to the ladder language. Therefore, a degree of freedom in converting a language of the program is enhanced.

Further, according to the embodiments described above, the program generation apparatus includes the requirements specification conversion unit 6 for converting the requirements specification B into a format of an automaton. The control law derivation unit 4 (or the control law derivation unit 4A, the control law derivation unit 4B) derives the control law, based on the model and the requirements specification B converted into the format of the automaton, so as to satisfy the requirements specification B. According to the configuration described above, derivation of the control law in the control law derivation unit 4 is facilitated, and processing time required to derive the control law can be reduced.

Further, according to the embodiments described above, the program generation apparatus includes the requirements specification learning unit 9 (or the requirements specification learning unit 9D) for learning the requirements specification B related to the transitions of the states of the device, based on information related to the transitions of the states of the device satisfying the requirements specification B and information related to the transitions of the states of the device not satisfying the requirements specification B. The control law derivation unit 4C (or the control law derivation unit 4D) derives the control law, based on the model and the requirements specification B learned by the requirements specification learning unit 9 (or the requirements specification learning unit 9D), so as to satisfy the requirements specification B. According to the configuration described above, even when the requirements specification B is not directly input, the control law can be derived by learning and obtaining the requirements specification B, based on the requirements specification related information C.

Further, according to the embodiments described above, to the requirements specification learning unit 9D, at least a part of the requirements specification B is input. According to the configuration described above, with reference to such a part of the requirements specification B, the requirements specification obtained as a result of learning based on the requirements specification related information C can be additionally used. Therefore, even if the user cannot describe the requirements specification B completely, a program for causing the target to be controlled to operate as desired by the user can be generated.

Further, according to the embodiments described above, the program generation apparatus includes the parameter input unit 7 for inputting a threshold for limiting the number of times of transitions of the states of the device to the control law derivation unit 4. The control law derivation unit 4 derives the control law being the number of times of transitions not exceeding the threshold. According to the configuration described above, by adjusting the integer value K to be set in the parameter input unit 7 and limiting the number of times of transitions of the states, a program with allowable execution time can be obtained in a short period of time.

Further, according to the embodiments described above, the program generation apparatus includes the display unit 8 for displaying at least one of an external appearance and an operation of the target to be controlled, based at least on the design information A, the model, and the control law. According to the configuration described above, the external appearance and the operation of the target to be controlled displayed in the display unit 8 can be checked as appropriate, which can be utilized for checking of the operation of the target to be controlled, modification of the requirements specification, or the like, with use of the generated program. As a result, the user can more easily obtain a desired program.

According to the embodiments described above, in the program generation method, the design information A, which at least includes a plurality of states of a device constituting the target to be controlled, respective relationships between signals input and output between a target to be controlled and a controller and the states of the device, and time required for each of changes of the states of the device, is converted into a model, which at least includes a state set being a set of states of the device, an input set being a set of signals input from the controller to the target to be controlled, a transition function being a function representing transitions between the states of the device included in the state set as caused due to the signals input to the target to be controlled, and time required for each of the transitions represented by the transition function. Then, a control law for respectively associating the states of the device and the signals input from the controller to the target to be controlled is derived, based on a requirements specification B including a specification related to the time required for the transitions of the states of the device and the model, so as to satisfy the requirements specification B. Then, a program is generated, based on the control law.

According to the configuration described above, the control law is derived based on the model including the time required for the transitions, so as to satisfy the requirements specification including the time required for the transitions. Therefore, control (optimization) related to time is performed in the program generated based on the control law, and operating efficiency of the target to be controlled can be thus enhanced. Further, a rule for converting the generated program is not limited to the ladder language. Therefore, a degree of freedom in converting a language of the program is enhanced.

Note that order of performing each of the processes may be changed, unless there is a special restriction.

Further, also when another configuration illustrated in the specification of the present application is added to the above configuration as appropriate, that is, also when another configuration in the specification of the present application not referred to as the above configuration is added as appropriate, similar effects can be produced.

Modifications of Embodiments Described Above

In the embodiments described above, there may be a description of a dimension, a shape, a relative disposition relationship, a condition for implementation, or the like of each constituent element. However, these are one example in all aspects and not restrictive.

Therefore, numerous unillustrated modifications and their equivalents are assumed within the scope of the technology disclosed in the specification of the present application. For example, a case in which at least one constituent element is modified, added, or omitted, and a case in which at least one constituent element in at least one embodiment is selected and combined with a constituent element in another embodiment are encompassed.

Further, when the embodiments described above has a description that "one" constituent element is provided, "one or more" of the constituent elements may be provided, unless there is an inconsistency.

Further, the description in the specification of the present application is referred to for all purposes related to the present technologies, none of which is acknowledged as prior art.

Further, each constituent element described in the embodiments described above is assumed as software or firmware, or as hardware corresponding to the software or the firmware, and in both of the concepts, each constituent element is referred to as a "unit", a "processing circuit" (circuitry), or the like.

Further, the technology disclosed in the specification of the present application may encompass a case in which each constituent element is distributed in a plurality of apparatuses, that is, may encompass an aspect of a system as a combination of a plurality of apparatuses.

EXPLANATION OF REFERENCE SIGNS

1 Design information input unit, 2, 3001 Design information conversion unit, 3 Requirements specification input unit, 4, 4A, 4B, 4C, 4D, 3002 Control law derivation unit, 5, 3003 Program generation unit, 6 Requirements specification conversion unit, 7 Parameter input unit, 8 Display unit, 9, 9D Requirements specification learning unit, 1102A, 1102B Processing circuit, 1103 Storage apparatus, 1104A, 1104B Input apparatus, 1105A, 1105B Output apparatus

The invention claimed is:

1. Program generation circuitry configured to control a target to be controlled, the program generation apparatus comprising:

at least one processor to execute a program; and at least one memory to store the program which, when it is executed by the processor, performs processes of:

converting design information into a model, the design information at least including a plurality of states of a device constituting the target to be controlled, respective relationships between signals input and output between the target to be controlled and the at least one processor and the plurality of states of the device, and time required for each of changes of the plurality of states of the device, the model at least including a state set being a set of the plurality of states of the device, an input set being a set of the signals input from the at least one processor to the target to be controlled, a transition function being a function representing transitions between the plurality of states of the device included in the state set, the transitions being caused due to the signals input to the target to be controlled, and time required for each of the transitions represented by the transition function;

deriving a control law for respectively associating the plurality of states of the device and the signals input from the at least one processor to the target to be controlled, based on a requirements specification including a specification related to the time required for each of the transitions of the plurality of states of the device and the model, so as to satisfy the requirements specification;

inputting a threshold for limiting the number of times of the transitions of the plurality of states of the device, wherein the deriving includes deriving the control law to limit the number of transitions of the plurality of states to not exceed the threshold;

generating the program, based on the control law; and executing the generated program in the at least one processor to control the target to be controlled.

2. The program generation circuitry according to claim 1, wherein the model includes a property satisfied by each of the plurality of states of the device.

3. The program generation circuitry according to claim 1, the processes further comprising converting the requirements specification into a format of an automaton, wherein the deriving includes deriving the control law, based on the model and the requirements specification converted into the format of the automaton, so as to satisfy the requirements specification.

4. The program generation circuitry according to claim 1, the processes further comprising learning the requirements specification related to the transitions of the plurality of states of the device, based on information related to the transitions of the plurality of states of the device satisfying the requirements specification and information related to the transitions of the plurality of states of the device not satisfying the requirements specification, wherein the deriving includes deriving the control law, based on the model and the requirements specification learned in the learning, so as to satisfy the requirements specification.

5. The program generation circuitry according to claim 4, wherein the learning includes learning at least a part of the requirements specification.

6. The program generation circuitry according to claim 1, the processes further comprising displaying at least one of an external appearance and an operation of the target to be controlled, based at least on the design information, the model, and the control law.

7. The program generation circuitry according to claim 1, the processes further comprising converting the requirements specification into a format of an automaton.

8. The program generation circuitry according to claim 1, the processes further comprising converting the requirements specification into a format of an automaton, wherein the deriving includes deriving the control law.

9. The program generation circuitry according to claim 1, the processes further comprising learning the requirements specification related to the transitions of the plurality of states of the device, based on information related to the transitions of the plurality of states of the device satisfying the requirements specification and information related to the transitions of the plurality of states of the device not satisfying the requirements specification.

10. The program generation circuitry according to claim 1, the processes further comprising displaying at least one of an external appearance and an operation of the target to be controlled.

11. A program generation method for generating a program to be executed in at least one processor that controls a target to be controlled, the program generation method comprising:

converting design information into a model, the design information at least including a plurality of states of a device constituting the target to be controlled, respective relationships between signals input and output between the target to be controlled and the at least one processor and the plurality of states of the device, and time required for each of changes of the plurality of states of the device, the model at least including a state set being a set of the plurality of states of the device, an input set being a set of the signals input from the at least one processor to the target to be controlled, a transition function being a function representing transitions between the plurality of states of the device included in the state set, the transitions being caused due to the signals input to the target to be controlled, and time required for each of the transitions represented by the transition function;

deriving a control law for respectively associating the plurality of states of the device and the signals input from the at least one processor to the target to be controlled, based on a requirements specification including a specification related to the time required for each of the transitions of the plurality of states of the device and the model, so as to satisfy the requirements specification;

inputting a threshold for limiting the number of times of the transitions of the plurality of states of the device, wherein the deriving includes deriving the control law to limit the number of transitions of the plurality of states to not exceed the threshold;

generating the program, based on the control law; and executing the generated program in the at least one processor to control the target to be controlled.

12. The program generation method according to claim 11, wherein the model includes a property satisfied by each of the plurality of states of the device.

13. The program generation method according to claim 11, further comprising:

converting the requirements specification into a format of an automaton, wherein the deriving includes deriving the control law, based on the model and the requirements specification converted into the format of the automaton, so as to satisfy the requirements specification.

14. The program generation method according to claim 11, further comprising:

learning the requirements specification related to the transitions of the plurality of states of the device, based on information related to the transitions of the plurality of states of the device satisfying the requirements specification and information related to the transitions of the plurality of states of the device not satisfying the requirements specification, wherein the deriving includes deriving the control law, based on the model and the requirements specification learned in the learning, so as to satisfy the requirements specification.

15. The program generation method according to claim 14, wherein the learning includes learning at least a part of the requirements specification.

16. The program generation method according to claim 11, further comprising:

displaying at least one of an external appearance and an operation of the target to be controlled, based at least on the design information, the model, and the control law.

* * * * *